United States Patent
Djelassi

(10) Patent No.: US 8,924,190 B2
(45) Date of Patent: Dec. 30, 2014

(54) METHOD AND SYSTEM FOR CORRECTING A TEMPERATURE MEASUREMENT SIGNAL

(75) Inventor: Cedrik Djelassi, Marolles en Hurepoix (FR)

(73) Assignee: Snecma, Paris (FR)

( * ) Notice: Subject to any disclaimer, the term of this patent is extended or adjusted under 35 U.S.C. 154(b) by 387 days.

(21) Appl. No.: 13/132,796

(22) PCT Filed: Dec. 8, 2009

(86) PCT No.: PCT/FR2009/052447
§ 371 (c)(1),
(2), (4) Date: Jun. 3, 2011

(87) PCT Pub. No.: WO2010/067009
PCT Pub. Date: Jun. 17, 2010

(65) Prior Publication Data
US 2011/0238351 A1    Sep. 29, 2011

(30) Foreign Application Priority Data
Dec. 9, 2008    (FR) ...................................... 08 58380

(51) Int. Cl.
*G06F 17/10*    (2006.01)
*G01K 7/42*     (2006.01)
*G01K 13/02*    (2006.01)

(52) U.S. Cl.
CPC . *G01K 7/42* (2013.01); *G01K 13/02* (2013.01)
USPC ....................................... 703/7; 703/2; 703/9

(58) Field of Classification Search
USPC ................... 703/2, 7, 9; 701/100; 702/99, 130
See application file for complete search history.

(56) References Cited

U.S. PATENT DOCUMENTS

| | | | | |
|---|---|---|---|---|
| 4,215,412 | A | * | 7/1980 | Bernier et al. ................ 701/100 |
| 5,080,496 | A | * | 1/1992 | Keim et al. ................... 374/144 |
| 7,246,495 | B2 | * | 7/2007 | Muramatsu et al. ............ 60/773 |
| 2004/0052291 | A1 | * | 3/2004 | Suurkuusk et al. ............ 374/31 |
| 2005/0126183 | A1 | | 6/2005 | Nakamura et al. |
| 2006/0212281 | A1 | * | 9/2006 | Mathews et al. ................. 703/7 |
| 2007/0073525 | A1 | * | 3/2007 | Healy et al. ...................... 703/7 |
| 2008/0178600 | A1 | * | 7/2008 | Healy et al. .................... 60/773 |
| 2009/0173078 | A1 | * | 7/2009 | Thatcher et al. ............... 60/773 |
| 2010/0023238 | A1 | * | 1/2010 | Adibhatla .................... 701/100 |

FOREIGN PATENT DOCUMENTS

GB    1 316 498    5/1973

OTHER PUBLICATIONS

U.S. Appl. No. 13/133,790, filed Jun. 9, 2011, Djelassi, et al.
International Search Report issued May 12, 2010 in PCT/FR09/52447 filed Dec. 8, 2009.

* cited by examiner

*Primary Examiner* — John Breene
*Assistant Examiner* — Corey Bailey
(74) *Attorney, Agent, or Firm* — Oblon, Spivak, McClelland, Maier & Neustadt, L.L.P.

(57) ABSTRACT

A method including digitally modelling a temperature measured by a sensor by using a modeled signal and estimating a lag error signal for the sensor from the modeled signal and a signal obtained by filtering the modeled signal, the filter having as a parameter an estimate of a time constant of the sensor, and correcting the measurement signal delivered by the sensor by the estimated lag error signal. The time constant of the sensor is estimated as a function of time from the measurement signal and the modeled signal.

6 Claims, 3 Drawing Sheets

METHOD AND SYSTEM FOR CORRECTING A TEMPERATURE MEASUREMENT SIGNAL

BACKGROUND OF THE INVENTION

The invention relates to the general field of measurements effected with the aid of sensors of parameters such as the temperature of a fluid, for example.

The invention relates more particularly to correcting a measurement signal delivered by a temperature sensor.

The invention thus has a preferred but non-limiting application in the field of aviation and notably in the field of control systems for aircraft engines such as turbojet engines.

As is known, to regulate and adapt the control of a jet engine to various flight constraints, it is necessary to measure the temperature of the various streams of gas passing through the turbojet engine (referred to as stream temperatures). To this end, temperature sensors such as probes or thermocouples are used, positioned at various places in the gas stream channel.

Temperature sensors generally suffer from thermal inertia that is specific to each sensor and that depends in particular on the mass or the size of the sensor. This inertia is reflected in a time shift between the moment at which the measurement is effected by the sensor and the moment at which it delivers a signal in response to that measurement. This is referred to as the measurement lag effect and can cause malfunctions of the turbojet engine because of poor adaptation thereof, in particular during rapid variations in the temperatures of the gas streams.

To alleviate this problem there exist techniques for correcting the measurement signals delivered by a temperature sensor that compensate the lag effect induced by the inertia of the sensor. One such technique is described in U.S. Pat. No. 5,080,496, for example.

Those techniques generally rely on digital modeling of the inertia of the sensor using a filter with parameters set by estimating the time constant of the sensor. As is known in itself, the time constant of a measurement sensor characterizes its response time, i.e. its inertia.

Prior art techniques for estimating the time constant of a temperature sensor use fixed graphs depending on one or more parameters, for example the flow rate of the fluid in which the sensor is placed. Those graphs indicate mean values of time constants for response time templates and predetermined conditions. In other words, they do not in fact take account of the spread of inertia from one temperature sensor to another.

Current fabrication technologies do not enable temperature sensors for controlling turbojet engines to be produced at low cost and that also comply with a response time template subject to little spread.

Consequently, it is difficult to obtain graphs adapted to the various temperature sensors concerned. Numerous problems have arisen when the time constants of the sensors mounted in a turbojet engine depart considerably from the values given by these graphs.

One solution would be to test each temperature sensor, for example in a wind tunnel, to determine its time constant under predefined conditions, and to extrapolate the graphs as a function of the time constant determined in this way. Such a test is particularly costly, however, and represents approximately one-third of the price of the temperature sensor. Consequently, it cannot be used for each temperature sensor, which means that a temperature sensor outside an acceptance template for which a graph is available might not be detected.

Furthermore, such tests are often carried out at fluid flow rates limited by the capacities of the wind tunnel and are generally not able to cover the range of working flow rates in turbojet engine applications. Extrapolating graphs to cover all the range of working flow rates introduces inaccuracies into the acquisition system of the temperature sensor.

Moreover, as mentioned above, the time constant of a temperature sensor depends on parameters such as the flow rate of the fluid in which the sensor is placed. This means that in order to estimate the time constant of a temperature sensor it is necessary first to estimate this fluid flow rate. Consequently, it is necessary to use additional estimator modules on the turbojet engine, which makes correcting measurements even more complex.

Consequently, there is a need for a simple method of correcting measurement signals delivered by a temperature sensor that allows high-quality compensation of the lag effect introduced by the sensor, regardless of the time constant of the sensor.

OBJECT AND SUMMARY OF THE INVENTION

The present invention addresses this need by providing a method of correcting a temperature measurement signal delivered by a sensor, said method including:
- a step of digitally modeling the temperature measured by a sensor by using a modeled signal;
- a step of estimating a lag error signal for said sensor from the modeled signal and a signal that is obtained by filtering the modeled signal, the filter having as a parameter an estimate of a time constant of the sensor; and
- a step of correcting the measurement signal that is delivered by the sensor by means of the estimated lag error signal.

In accordance with the invention, the time constant of the sensor is estimated as a function of time from the measurement signal and the modeled signal.

Thus the invention makes it possible to estimate in real time the time constant of the temperature sensor concerned and to correct measurement signals delivered by that sensor accordingly. The correction applied to the measurement signals (i.e. the lag effect compensation) is thus adapted to the temperature sensor used, whatever its inertia.

Thus the invention has the advantage of making it possible to use temperature sensors with time constants subject to a wide spread. Relaxing the need for a low spread of the time constants relative to a given template is reflected in a reduction in the manufacturing cost of the temperature sensors.

What is more, temperature sensors having higher time constants may be considered. This makes it possible to manufacture more rugged temperature sensors, notably by increasing the quantity of material around the sensitive elements of these sensors.

Moreover, in the field of aviation, determining the time constant of the temperature sensors in a wind tunnel is avoided, thereby reducing the cost of obtaining type approval for these sensors for controlling turbojet engines.

The invention has the further advantage of not requiring the use of any additional estimator module for evaluating the flow rate of the fluid in which the sensor is placed. The time constant of the sensor is estimated in an adaptive manner from signals conventionally evaluated to take account of the lag effect in temperature measurements effected by the sensor, namely the measurement signal delivered by the sensor and a modeled signal representing the temperature measured by the sensor.

In one particular implementation of the invention, to estimate the time constant of the sensor, the following steps are performed:

(a) obtaining first and second signals, respectively by differentiating the measurement signal and the modeled signal;

(b) evaluating a difference between the absolute value of the first signal and the absolute value of the second signal; and (c) estimating the time constant of the sensor from that difference.

Thus it is possible to circumvent the imperfections of the digital model used to estimate the temperature measured by the sensor in terms of absolute temperature estimation. Because the invention uses derivatives of the measurement signal and the model signal, it suffices to have available a digital model offering a good representation of the relative offsets of the measured temperatures.

In one particular implementation of the invention, the time constant of the sensor is estimated from the difference using an integral corrector type filter having a predetermined gain as a parameter.

This kind of filter is known in itself, and offers good performance in terms of correcting measurement signals.

Alternatively, other estimator modules may be used, for example estimator modules using higher order filters.

According to one aspect of the invention, before the step (c) of estimating the time constant, the absolute value of the first signal is compared to a predetermined threshold.

This comparison makes it possible in particular to detect whether the value of the derivative of the measurement signal is low and, if necessary, not to estimate the value of the time constant from the difference.

A low value for the derivative of the measurement signal indicates a thermally stable phase during which the time constant varies very little if at all. From a hardware implementation point of view, an exactly zero difference cannot be obtained because of the presence of measurement noise inherent to the measurement sensor and to the associated acquisition system. Consequently, the estimation of the time constant may diverge, notably if it is implemented using an integral corrector type filter.

According to another aspect of the invention, after the step (c) of estimating the time constant, it is verified that the estimated time constant is between a predefined minimum value and a predefined maximum value.

This ensures that the estimate of the time constant does not diverge. Predefined tolerance values for the temperature sensor, for example specified by the sensor manufacturer, may be used as the minimum value and the maximum value, for example.

In a correlated way, the invention also provides a system for correcting a temperature measurement signal delivered by a sensor, said system including:

means for digitally modeling the temperature measured by the sensor by using a modeled signal;

means for estimating a time constant of the sensor;

means for filtering the modeled signal, having as a parameter the estimated time constant of the sensor;

means for estimating a lag error signal for the sensor from the modeled signal and the filtered signal; and means for correcting the measurement signal delivered by the sensor using the estimated lag error signal;

said system being noteworthy in that the means for estimating the time constant of the sensor are adapted to estimate this time constant as a function of time from the measurement signal and the modeled signal.

As mentioned above, because of its above-mentioned features and advantages, the invention has a preferred but non-limiting application in the field of aviation and more particularly in the field of aircraft engine regulation and control.

Thus the invention also provides a turbojet engine including at least one system for correcting a measurement signal delivered by a temperature sensor of the invention.

BRIEF DESCRIPTION OF THE DRAWINGS

Other features and advantages of the present invention emerge from the following description given with reference to the appended drawings, which show a non-limiting embodiment of the present invention. In the figures.

DETAILED DESCRIPTION OF AN EMBODIMENT

Figure 1:
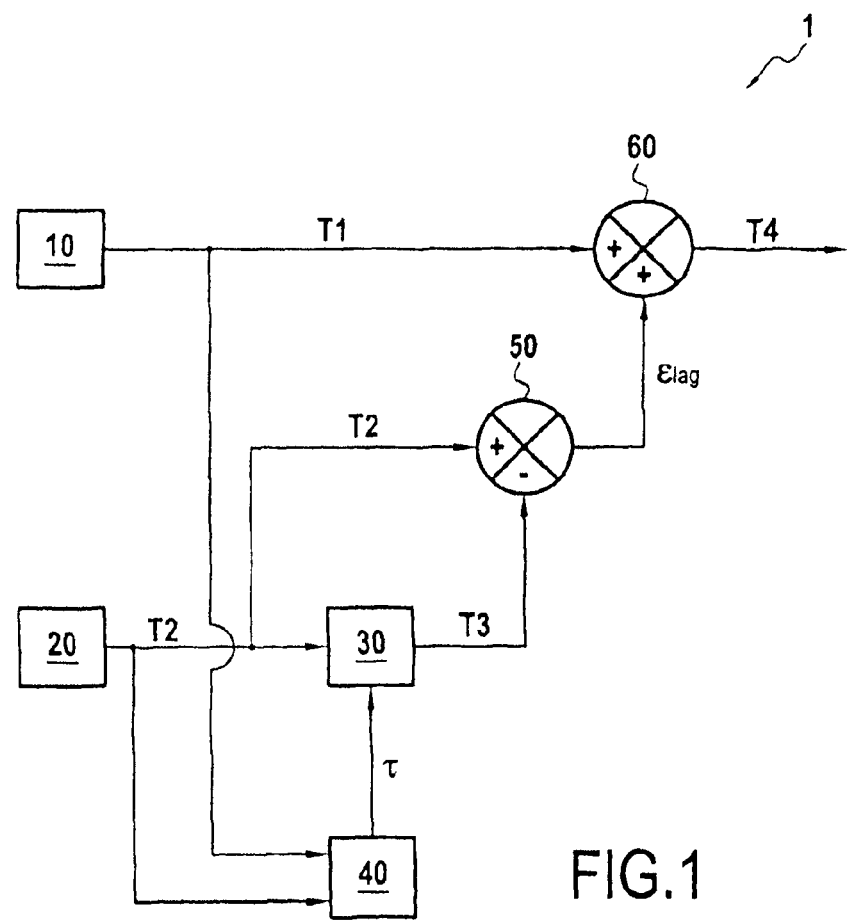
FIG. 1 is a diagram showing a system of the invention for correcting a measurement signal and the principal steps of a correction method of one particular implementation of the invention.

FIG. 1 represents a system 1 and a method of one particular embodiment of the invention for correcting a measurement signal T1 delivered by a temperature sensor 10 having thermal inertia and used to control an aircraft turbojet engine.

This assumption is not limiting on the invention, however, which may be used in other applications liable to employ a temperature sensor having thermal inertia.

Thus in the embodiment described here all or part of the correction system 1 is coupled to or incorporated in the full authority digital engine control (FADEC) system of the aircraft propelled by the turbojet engine.

The example described here more particularly envisages correcting a measurement signal representing the temperature $T_{25}$ at the inlet of the high-pressure compressor of the turbojet engine. Of course, the invention applies equally to other temperatures that may be measured in a turbojet engine.

The remainder of the description considers signals and parameters sampled with a sampling period Te. This sampling period Te is of the order 20 milliseconds (ms) to 40 ms, for example. As is known, it depends in particular on the dynamic range of the measured temperature.

Note however that the invention may equally be employed with continuous signals and continuous parameters.

According to the invention, the correction system 1 includes a digital modeling module 20 used to model the temperature $T_{25}$ measured by the temperature sensor 10. In other words, the digital modeling module 20 is adapted to model the measurement signal that would be delivered by the temperature sensor 10 it were operating without errors linked to its time constant or, which amounts to the same thing, if it had a zero time constant.

Figure 2:
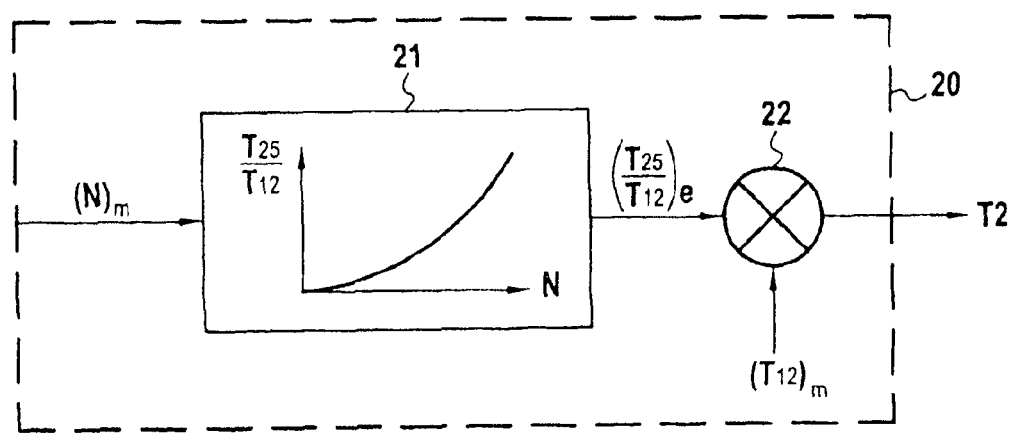
FIG. 2 is a diagram showing one example of a digital modeling module that may be used in the correction system shown in FIG. 1 to model the temperature measured by the sensor.

FIG. 2 is a diagram representing one example of a digital modeling module that may be used.

In this example, the digital modeling module 20 includes an entity 21 adapted to deliver an estimate of the temperature ratio $T_{25}/T_{12}$ from a measurement $(N)_m$ of the rotation speed of the fan of the turbojet engine, $T_{12}$ being the temperature at the fan inlet. This estimate is calculated by the entity 21 using a predetermined curve representing the variation of the adiabatic temperature ratio $T_{25}/T_{12}$ as a function of the rotation speed N of the fan. Such a curve is known to the person skilled in the art and is not described in more detail here.

The estimate $(T_{25}/T_{12})_e$ of the ratio $T_{25}/T_{12}$ is then sent to a multiplier circuit 22 adapted to multiply this ratio by a measured value $(T_{12})_m$ of the temperature $T_{12}$. This produces at the output of the multiplier circuit 22 the modeled signal T2.

The measured value $(T_{12})_m$ of the temperature $T_{12}$ and the measured value $(N)_m$ of the rotation speed of the fan are obtained by means of sensors that are known in themselves, placed in the turbojet engine, and not described in more detail here.

Alternatively, a more sophisticated and more precise digital model of the temperature measured by the sensor may be employed. One such model is described in particular in U.S. Pat. No. 5,080,496.

Note that, in the example described here, what is to be corrected is a signal of a measurement taken of the temperature $T_{25}$. However, as mentioned above, the invention applies to other temperatures that may be measured in a turbojet engine provided that a model of the variation of those temperatures is available.

The signal T2 as modeled in the above manner by the module 20 is then filtered by a module 30 modeling the inertia of the temperature sensor. This module 30 is for example a first order filter having the transfer function $H_{10}(p)$ that is given by the following equation, in which T is a parameter representing the time constant of the sensor 10 estimated by an estimator module 40 described in detail below with reference to FIGS. 3 and 4:

$$H_{10}(p) = \frac{1}{1+\tau p}$$

A calculator module 50 then estimates the lag error signal $\epsilon$-lag introduced by the temperature sensor 10 by calculating a difference signal between the modeled signal T2 and the filtered modeled signal T3.

The lag error $\epsilon_{lag}$ is then added to the measurement signal T1 delivered by the sensor 10 by a corrector module 60. This produces a corrected measurement signal T4 in which the lag effect introduced by the temperature sensor 10 has been compensated.

Figure 3:
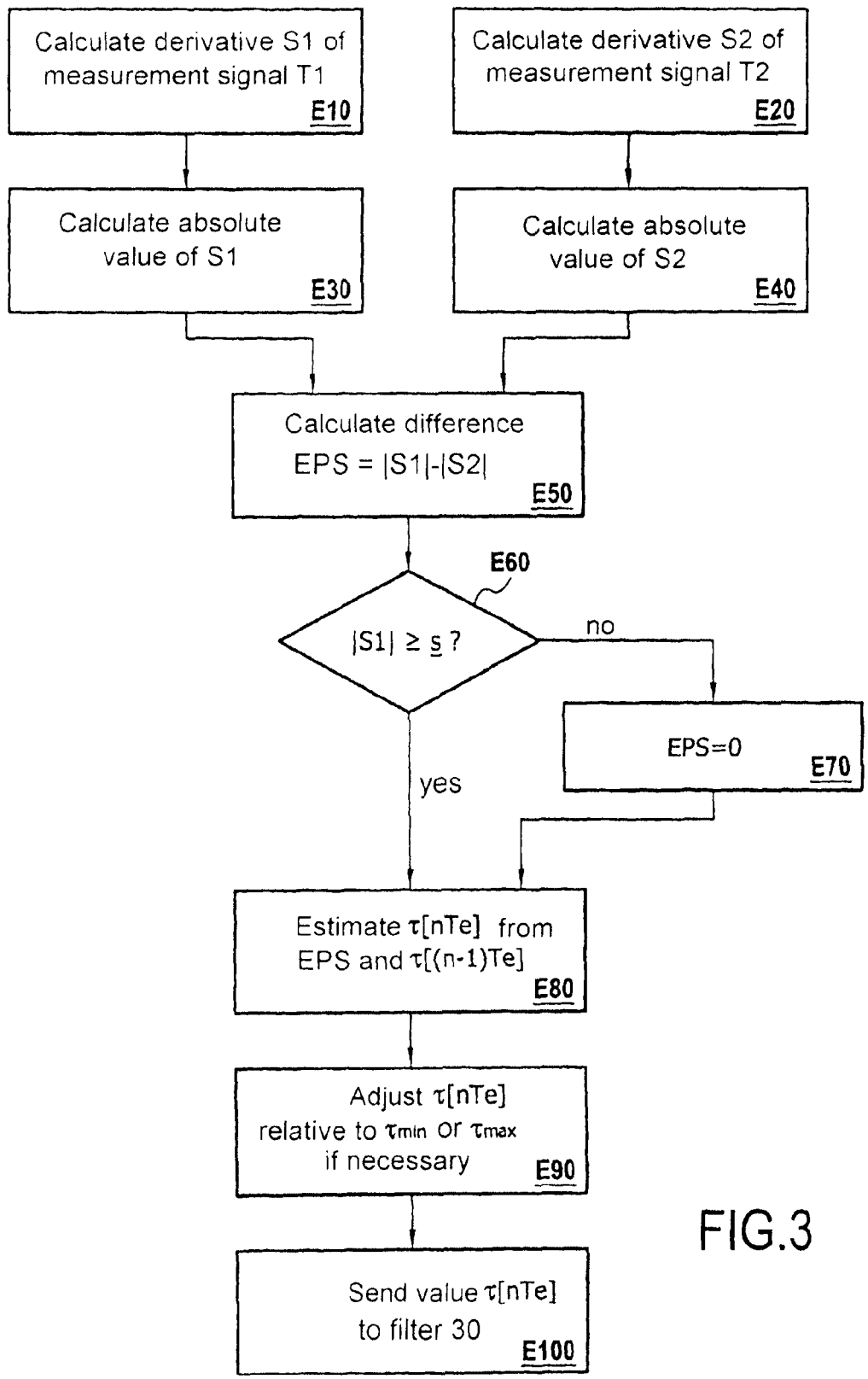
FIG. 3 is a flowchart showing the principal steps of estimating the time constant of a temperature sensor in a method of one particular implementation of the invention for correcting a measurement signal and as executed by the system shown in FIG. 1.
Figure 4:
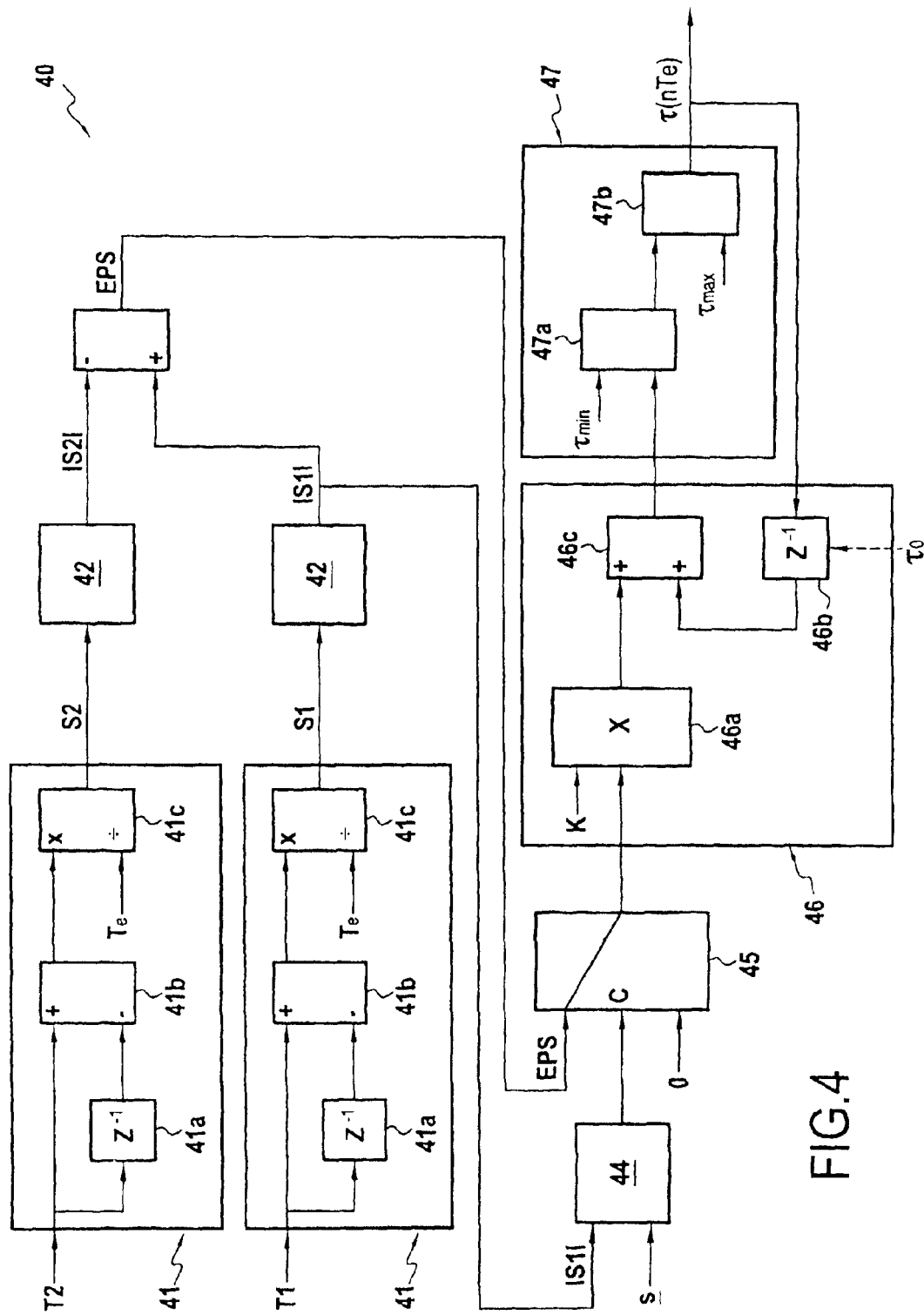
FIG. 4 is a diagram showing one example of means for estimating the time constant of a sensor as a function of time by executing the steps shown in FIG. 3.

The main steps of the method and the implementation means used by the estimator module 40 to estimate the time constant τ of the temperature sensor as a function of time are described below with reference to FIGS. 3 and 4.

In the embodiment described here, the estimator module 40 employs an adaptive algorithm to estimate the time constant τ in real time. To be more precise, the time constant τ is evaluated at a given time t=nTe (where n is an integer) from a value of that time constant estimated at an earlier time.

According to the invention, the measurement signal T1 and the modeled signal T2 are used to estimate the time constant τ of the sensor 10. To be more specific, in the embodiment described here, a first signal S1 is evaluated by differentiating the measurement signal T1 (step E10) and a second signal S2 is evaluated by differentiating the modeled signal T2 (step E20).

The derivative S1 of the measurement signal is obtained using a first differentiator module 41. This is for example a first order filter adapted to evaluate the signal S1 at the time t=nTe from the following equation, in which S1[nTe] and T1[nTe] represent the signals S1 and T1 respectively, as sampled at the time nTe:

$$S1[nTe] = \frac{T1[nTe] - T1[(n-1)Te]}{Te}$$

To this end, as is known, the differentiator module 41 includes:
- a delay cell 41a delivering the measurement signal at the earlier time (n−1)Te;
- a subtractor element 41b for subtracting from the measurement signal T1[nTe] the delayed measurement signal T1[(n−1)Te]; and
- a divider element 41c adapted to divide the sum obtained in this way by the sampling period Te.

Alternatively, the differentiator module 41 may be a higher order filter.

The signal S2 is obtained in a similar way from the modeled signal T2 using a second differentiator module 41 adapted to evaluate the signal S2 at the time nTe from the following equation, in which S2[nTe] and T2[nTe], represent the signals S2 and T2 respectively, as sampled at the time nTe:

$$S2[nTe] = \frac{T2[nTe] - T2[(n-1)Te]}{Te}$$

The absolute value |S1[nTe]| of the signal S1 (step E30) and the absolute value |S2[nTe]| of the signal S2 (step E40) are then evaluated using an appropriate calculator module 42 known to the person skilled in the art and not described in detail here.

A difference signal EPS is then calculated by a subtractor module 43 from the signals |S1[nTe]| and |S2[nTe]| (step E50), for example here using the following equation:

$$EPS = |S1[nTe]| - |S2[nTe]|$$

In the embodiment described here, the signal |S1[nTe]| obtained from the derivative of the measurement signal T1 is compared to a predefined threshold s using a comparator 44 (step E60). This comparison is intended to detect a low value of the signal S1, representing a stage of temperature stability. The predefined threshold s is therefore chosen to enable this.

Because of measurement noise inherent to the acquisition system of the temperature sensor 10, it is difficult, if not impossible, to obtain a zero value of EPS during any such stage of temperature stability. This may cause the adaptive algorithm to diverge. Consequently, to alleviate this problem, it is advantageously proposed here to force the value of the difference EPS to zero if the absolute value of the first signal S1 is below a particular threshold s (step E70).

This operation is effected by a module 45 of action that is conditioned by the output of the comparator 44, for example:
- the output of the module 45 goes to EPS if |S1[nTe]|≥s;
- else, the output of the module 45 goes to 0.

Note that in the embodiment described here the comparison E60 is effected after evaluating the difference EPS. Alternatively, it may be effected before evaluating the difference EPS, since evaluation of the signal S2 may be made conditional on the result of the comparison.

The output of the module 45 is then sent to an estimator module 46 adapted to estimate the parameter τ at the time nTe as a function of the difference EPS and a previously estimated value of the parameter τ. The estimator module 46 is for example of the integral corrector type (an integral corrector filter), with a gain parameter K (K being a real number), known to the person skilled in the art, and performing the following operation (step E80), where τ[nTe] is the value of the constant τ at the time nTe:

$$\tau[nTe]=\tau[(n-1)Te]+K \times EPS$$

In other words, if during the step E60 it is detected that |S1[nTe]|<s, forcing the value of the difference EPS to zero during the step E70 amounts, as it were, to suspending the estimation of the time constant τ, taking as the value of the time constant τ at time nTe the value of the time constant τ estimated at the time (n−1)Te. This prevents the adaptive algorithm diverging.

As is known, the integral corrector estimator module 46 includes a multiplier element 46a multiplying the difference signal EPS by the gain K, a delay cell 46b delivering the value τ[(n−1)Te], and an adder element 46c calculating the value τ[nTe] from the above equation.

Note that, as is known in itself, the chosen initial value of the time constant $\tau_0$, the sampling period Te, and the value of the gain K are the result of a compromise between estimation performance and adaptive algorithm convergence speed. For example, the initial value of the time constant $\tau_0$ may be chosen from a graph provided by the manufacturer of the temperature sensor 10 and as used in prior art techniques.

Alternatively, estimator modules of types other than the integral corrector type may be used, for example estimator modules using higher order filters.

In the embodiment described here, the time constant τ[nTe] estimated by the integral corrector estimator module 46 is then sent to a module 47 for ensuring that the value of the constant is between a predetermined minimum value $\tau_{min}$ and a predetermined maximum value $\tau_{max}$ and adjusting this value in the event of divergence relative to the minimum and maximum values.

To this end, the adjustment module 47 includes a first module 47a that forces the value of the time constant τ[nTe] to $\tau_{min}$ if τ[nTe]<$\tau_{min}$ and a second module 47b that forces the value of the time constant τ[nTe] to $\tau_{max}$ if τ[nTe]>$\tau_{max}$ (step E90). The minimum and maximum values are chosen beforehand, for example as a function of minimum and maximum tolerances of the temperature sensor indicated by the manufacturer of the sensor.

The time constant, where appropriate the adjusted time constant, is then sent to the filter 30 (step E100) to be used to generate the filtered signal T3.

The invention claimed is:

1. A method of correcting a temperature measurement signal delivered by a sensor, the method comprising:
    digitally modeling the temperature measured by the sensor by using a modeled signal;
    estimating a lag error signal for the sensor from the modeled signal and a signal obtained by filtering the modeled signal, the filter having as a parameter an estimate of a time constant of the sensor; and
    correcting, using a processor, the measurement signal delivered by the sensor by the estimated lag error signal;
    wherein the time constant of the sensor is estimated as a function of time from the measurement signal and the modeled signal
    wherein, to estimate the time constant of the sensor, the following operations are performed:
        (a) obtaining first and second signals, respectively, by differentiating the measurement signal and the modeled signal;
        (b) evaluating a difference between the absolute value of the first signal and the absolute value of the second signal; and
        (c) estimating the time constant of the sensor from the evaluated difference.

2. A correction method according to claim 1, wherein the time constant of the sensor is estimated from the difference using an integral corrector type filter having a predetermined gain as a parameter.

3. A correction method according to claim 1, wherein, before the estimating the time constant, the absolute value of the first signal is compared to a predetermined threshold.

4. A correction method according to claim 1, wherein after the estimating the time constant, it is verified that the estimated time constant is between a predefined minimum value and a predefined maximum value.

5. A system for correcting a temperature measurement signal delivered by a sensor, the system comprising:
    means for digitally modeling the temperature measured by the sensor by using a modeled signal;
    means for estimating a time constant of the sensor;
    means for filtering the modeled signal, having as a parameter the estimated time constant of the sensor;
    means for estimating a lag error signal for the sensor from the modeled signal and filtered signal from the means for filtering; and
    means for correcting the measurement signal delivered by the sensor using the estimated lag error signal;
    wherein the means for estimating the time constant of the sensor estimates the time constant as a function of time from the measurement signal and the modeled signal
    wherein, the means for estimating the time constant of the sensor, include performing the following operations:
        (a) obtaining first and second signals, respectively, by differentiating the measurement signal and the modeled signal;
        (b) evaluating a difference between the absolute value of the first signal and the absolute value of the second signal; and
        (c) estimating the time constant of the sensor from the evaluated difference.

6. A turbojet engine comprising at least one system for correcting a temperature measurement signal delivered by a sensor according to claim 5.

* * * * *